United States Patent
Lavedas

(10) Patent No.: US 8,723,649 B2
(45) Date of Patent: May 13, 2014

(54) ANTENNA FOR PROTECTING RADIO FREQUENCY COMMUNICATIONS

(75) Inventor: Thomas G. Lavedas, Clifton, VA (US)

(73) Assignee: Raytheon Company, Waltham, MA (US)

(*) Notice: Subject to any disclaimer, the term of this patent is extended or adjusted under 35 U.S.C. 154(b) by 649 days.

(21) Appl. No.: 13/027,560

(22) Filed: Feb. 15, 2011

(65) Prior Publication Data

US 2012/0206238 A1 Aug. 16, 2012

(51) Int. Cl.
*G08B 13/14* (2006.01)
*H04K 1/02* (2006.01)

(52) U.S. Cl.
USPC ............... 340/10.1; 340/572.4; 340/572.8; 340/10.2; 340/10.3; 340/10.5

(58) Field of Classification Search
CPC ............ G08B 13/14; H04K 1/02; H03B 5/08; H01Q 7/08
USPC ............ 340/572.4, 572.7, 539.21, 10.1–10.5; 235/380, 381; 380/252; 455/1
See application file for complete search history.

(56) References Cited

U.S. PATENT DOCUMENTS

| | | | |
|---|---|---|---|
| 4,217,550 A | 8/1980 | Blassel et al. | |
| 4,920,352 A | 4/1990 | Martensson et al. | |
| 4,977,614 A | 12/1990 | Kurcbart | |
| 5,128,686 A | 7/1992 | Tan et al. | |
| 5,321,412 A | 6/1994 | Kopp et al. | |
| 5,513,383 A | 4/1996 | Tsao | |
| 6,031,508 A | 2/2000 | Ishizuka et al. | |
| 6,208,235 B1 | 3/2001 | Trontelj | |
| 6,208,874 B1 | 3/2001 | Rudisill et al. | |
| 6,429,768 B1 | 8/2002 | Flick | |
| 6,597,318 B1 | 7/2003 | Parsche et al. | |
| 6,819,295 B1* | 11/2004 | Peng et al. | 343/728 |
| 6,970,141 B2* | 11/2005 | Copeland et al. | 343/866 |
| 7,019,651 B2 | 3/2006 | Hall et al. | |
| 7,221,900 B2* | 5/2007 | Reade et al. | 455/1 |
| 7,591,415 B2 | 9/2009 | Jesme | |
| 7,612,675 B2 | 11/2009 | Miller et al. | |
| 7,808,389 B2* | 10/2010 | Finkenzeller | 340/572.4 |
| 7,902,934 B2* | 3/2011 | Nakamura et al. | 331/181 |
| 8,121,532 B2* | 2/2012 | Huang | 455/1 |
| 8,174,454 B2* | 5/2012 | Mayer | 343/725 |
| 8,466,791 B2* | 6/2013 | Goto et al. | 340/572.7 |
| 2004/0100359 A1* | 5/2004 | Reade et al. | 340/5.2 |

(Continued)

OTHER PUBLICATIONS

Zetter, K. "Jamming Tags Block RFID Scanners", wired magazine online, Mar. 1, 2004, 4 pages, http://www.wired.com/techbiz/media/news/2004/03/62468?currentPage=all, last accessed Feb. 28, 2011.

(Continued)

*Primary Examiner* — Nam V Nguyen
(74) *Attorney, Agent, or Firm* — Daly, Crowley, Mofford & Durkee, LLP

(57) ABSTRACT

An antenna for protecting radio frequency communications includes a masking portion to broadcast a masking signal including a first loop and a second loop connected to the first loop, wherein a current supplied to the masking portion flows in opposite polarity in each of the first and second loops. The antenna includes a reader loop to receive a response signal from a responder and decoupled from the masking signal, wherein the masking signal masks the response signal about the responder.

26 Claims, 3 Drawing Sheets

(56) References Cited

U.S. PATENT DOCUMENTS

| | | |
|---|---|---|
| 2005/0212673 A1 | 9/2005 | Forster |
| 2007/0185546 A1 | 8/2007 | Tseng et al. |
| 2009/0021343 A1 | 1/2009 | Sinha |
| 2009/0041241 A1* | 2/2009 | Dobyns et al. ............... 380/252 |
| 2009/0081943 A1* | 3/2009 | Dobyns et al. ............... 455/1 |
| 2010/0069011 A1 | 3/2010 | Carrick et al. |

OTHER PUBLICATIONS

Savry, O., et al., "Secure RFID transactions with a noisy reader," Design & System Integration Division Defense & Security, Scientific Report 2008, Cea Leti, p. 9.

U.S. Appl. No. 13/027,434, Thomas G. Lavedas, et al., filed Feb. 15, 2011, 38 pages.

* cited by examiner

ANTENNA FOR PROTECTING RADIO FREQUENCY COMMUNICATIONS

FIELD OF THE INVENTION

This invention generally relates protecting RF communications and, more particularly, to protecting radio frequency identification (RFID) systems from unwanted exposure and eavesdropping.

BACKGROUND

Radio frequency identification (RFID) systems operating in the high-frequency range, typically at 13.56 Megahertz (MHz), are radiation limited by governmental regulations, such as the Federal Communications Commission (FCC) rules governing the industrial, scientific, and medical (ISM) operating bands commonly used for these unlicensed systems, in particular 47CFR15.225. These RFID systems are commonly known as vicinity readers because they are capable of reading credit card sized RFID cards to a distance of 60 centimeters (about two feet).

Conventional RFID systems are vulnerable to eavesdropping from unauthorized devices which may intercept and receive information in the RF domain. Such information may include transactional information, such as passwords transmitted during RFID card authentication transactions and/or personal data. In response to efforts to expand the use of RFID enabled documents and devices, organizations advocating greater public privacy and security protections have raised concerns over RFID system vulnerabilities. These concerns have limited industry efforts to make RFID systems more widely available for a variety of useful applications.

SUMMARY

In general overview, the inventive concepts, systems, and techniques described herein protect radio frequency identification (RFID) systems from eavesdropping. More particularly, an antenna reduces, minimizes, and/or prevents unauthorized readers from eavesdropping on communications between the antenna and an RFID card. The antenna includes masking and reading portions which do not (or minimally) interfere with each other over the RF domain. In other words, the masking and reading portions are decoupled/isolated from each other so that each may act independently of the other.

Such decoupling features enable the antenna to broadcast a masking signal without degrading or interfering with the antenna's ability to communicate with a responder, which may include an RFID card. At the same time, the masking signal is configured to mask or interfere with the responder's signals to prevent unauthorized readers from eavesdropping on RFID transactions. In some embodiments, for example, an antenna includes a masking portion for broadcasting a masking signal and a reading portion for communicating with the responder.

In some embodiments, the antenna requests information from a responder (which may also be referred to as a transponder) which includes an RFID card to initiate and enable certain actions including, but not limited to, granting (or denying) entryway into a facility, passing information (such as user account information) to and from the RFID card, etc. The antenna transmits an interrogation signal to request the information from the card and in response the card transmits a response signal including the information. The response signal (which may be referred to as a "backscatter" signal) is broadcast throughout the RF environment where it may be exposed to unauthorized readers (such as rogue antennas) attempting to eavesdrop on the communications.

To prevent a rogue antenna from eavesdropping, the antenna broadcasts a masking signal configured to mask the RFID card's response signal. More particularly, the masking signal interferes with clear reception of the response signal to thwart and/or defeat the rogue antenna's attempts at receiving and eavesdropping on the response signal. In some embodiments, the masking signal is generated based on the RFID card's response signal which may be modified to appear as noise, while in other embodiments, the masking signal is generated to appear as a signal from another RFID card in order to confuse eavesdroppers.

In one aspect, an antenna includes a masking portion to broadcast a masking signal including a first loop and a second loop connected to the first loop, wherein a current supplied to the masking portion flows in opposite polarity in each of the first and second loops. The antenna further includes a reader loop to receive a response signal from a responder and decoupled from the masking signal, wherein the masking signal masks the response signal in an area about the responder.

In further embodiments, the antenna includes one or more of the following features: the first loop defines a first enclosed area and the second loop defines a second enclosed area smaller than the first enclosed area, and the first loop, second loop, and reader loop are substantially parallel; at least one adjuster element coupled to at least one of the first loop or the second loop, herein known as the adjustable loop, configured to adjust a size of the enclosed area of the adjustable loop; the at least one adjuster element adjusts the size of the enclosed area about a phase center point of the adjustable loop; the first loop, second loop, and reader loop are coplanar and are centered about a phase center point; the responder is a radio frequency identification (RFID) card or portable electronic device which transmits the response signal in response to an interrogation signal transmitted by the reader loop; the interrogation signal includes a request for RFID card information and the response signal includes the information; the masking signal is at least 10 times stronger than the response signal; the masking signal is generated based on the response signal; the masking signal appears as noise to mask the response signal; the masking signal is based on another response signal from at least one other antenna in the area about the responder, and; a trimmer to control a proportion of the current supplied to each of the first and second loops.

In another aspect, a method for protecting RF communications using an antenna having a reader loop, a first loop and a second loop includes generating an interrogation signal, receiving a response signal from the reader loop of the antenna, providing a current to the first loop of the antenna and the second loop of the antenna coupled to the first loop, the current being of reverse polarity between the two loops, decoupling the first loop and the second loop from the reader loop of the antenna in the radio frequency domain, and generating a masking signal using the first loop and the second loop to mask the response signal about the responder.

In further embodiments, the method includes one or more of the following features: said decoupling comprises controlling a proportion of the current to each of the first loop and the second loop; said decoupling includes at least one of: controlling a size of a first enclosed area of the first loop or controlling a size of a second enclosed area of the second loop, the second enclosed area smaller than the first enclosed area, wherein the first and second loop are coplanar and the first and second loop are parallel to the reader loop; the first loop, second loop, and reader loop are coplanar; said decoupling includes at least one of: adjusting a size of a first enclosed area of the first loop about a phase center point of the first loop or controlling a size of a second enclosed area of the second loop about a phase center point of the second loop, wherein the second enclosed area is smaller than the first enclosed area, the first and second loop are coplanar and parallel to the reader loop; the response signal originates from an RFID card or portable electronic device and said receiving a response signal comprises receiving identification information from the RFID card or portable electronic device; said generating a masking signal comprises generating the masking signal to appear as noise; said generating a masking signal includes generating the masking signal based on the response signal; said generating a masking signal comprises generating the masking signal based on another response signal from at least one other antenna in the area about the responder, and; said generating a masking signal comprises generating the masking signal to be at least 10 times stronger than the response signal.

In a further aspect, an RFID system includes an antenna including a masking portion to broadcast a masking signal. The masking portion includes a first loop and a second loop connected to the first loop, wherein a current supplied to the masking portion flows in opposite polarity in each of the first and second loops. The antenna further includes a reader loop to receive a response signal from a responder and decoupled from the masking signal, wherein the masking signal masks the response signal about the responder.

BRIEF DESCRIPTION OF THE DRAWINGS

The foregoing features of the antenna, techniques, and concepts described herein, may be more fully understood from the following description of the drawings in which.

DETAILED DESCRIPTION

As used herein, the following terms should be understood to have the indicated meanings:

When an item is introduced by "a" or "an," it should be understood to mean one or more of that item.

The terms "first," "second," and the like as used herein do not denote any order, quantity, or importance, but rather are used to distinguish one element from another.

"Comprises" means includes but it not limited to.

"Comprising" means including but not limited to.

"Having" means including but not limited to.

"Masking signal" means an interference/noise signal that is stronger than a signal to be masked such as an RFID response signal and/or a signal that when combined with an RFID response signal is unreadable and/or degraded to be unreadable. Also, a masking signal can be a decoy signal appearing as a signal from an RFID card.

Figure 1:
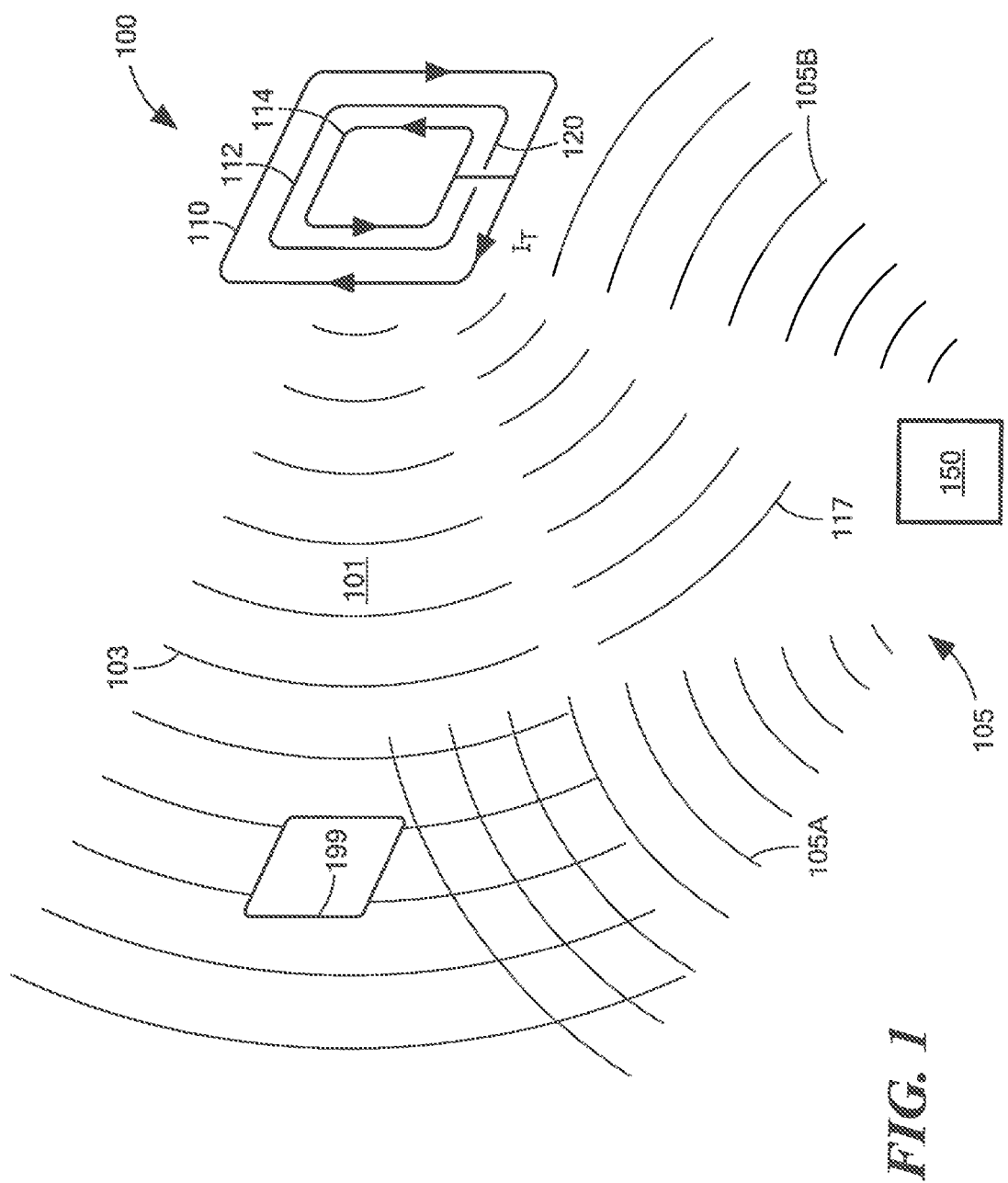
FIG. 1 is a pictorial view of an embodiment of an antenna according to the systems, concepts, and techniques described herein.

Referring to FIG. 1, in one aspect antenna 100 includes masking portion 110 to broadcast masking signal 103 and including first loop 112 and second loop 114 connected to first loop 112. Current $I_T$ supplied to masking portion 110 flows in opposite polarity in each of first and second loops 112, 114.

Reader loop 120 receives response signal 105 (for illustrative purposes, further designated by reference numerals 105A and 105B) from responder 150. Reader loop 120 is decoupled from masking signal 103. Masking signal 103 masks response signal 105 in an area (generally designed by reference numeral 101) about responder 150.

In another embodiment, responder 150 is a radio frequency identification (RFID) card which transmits response signal 105 in response to interrogation signal 117 transmitted by reader loop 120 of antenna 100. Interrogation signal 117 may include a request for RFID card information and, accordingly, response signal 105 may include requested information. In some embodiments, information includes authentication information such as an RFID card tag identifier and/or user (i.e., RFID card user) authentication information.

In some embodiments, reader loop 120 broadcasts interrogation signal 117 to responder 150, which includes an RFID card, to obtain RFID card 150 tag information so that the card 150 may be identified and/or validated. Interrogation signal 117 may include a control signal that is modulated onto a continuous wave carrier signal, $cos(\omega t)$, which may be at a predetermined frequency. Upon receipt of modulated interrogation signal 117, RFID card 150 backscatter modulates interrogation 117 with a tag modulation signal including tag identification information, such as the tag's ID and/or information related to a tagged item.

In some embodiments, antenna 100 generates masking signal 103 based on response signal 105 absent the tag identification information and to appear as noise in area 101 about RFID card 150. In this way, masking signal 103 masks response signal 105 to protect against eavesdropping from unauthorized readers (generally designated by reference numeral 199). It will be understood that other methods may used to generate masking signal 103. For example, a sample of a signal that appears to be from an RFID card may be used to generate masking signal 105 to appear as a response from the RFID card. Here, the masking signal may serve as a dummy or decoy RFID card signal.

Figure 2:
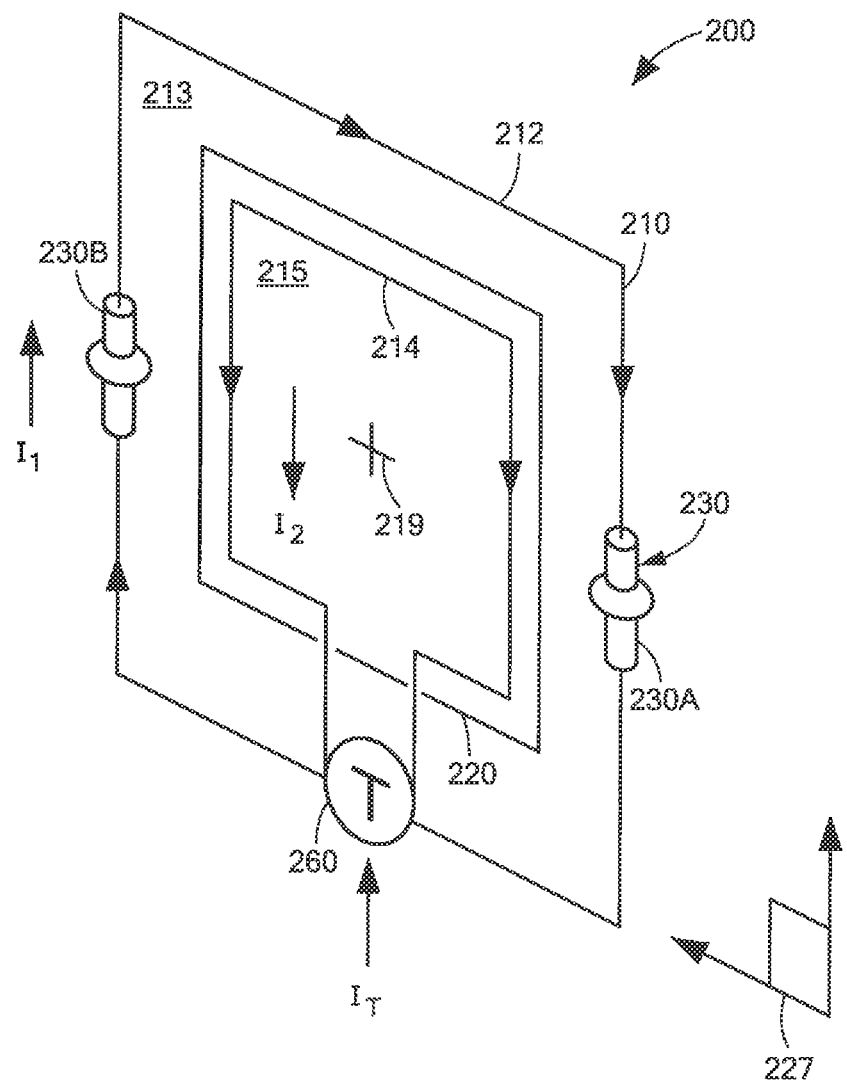
FIG. 2 is a pictorial view of a more detailed embodiment of the antenna of FIG. 1.

Referring to FIG. 2 and again to FIG. 1, in a more detailed embodiment, antenna 200 includes first loop 212 defining first enclosed area 213 and second loop 214 defining a second enclosed area 215 smaller than first enclosed area 213, and reader loop 220. First loop 212, second loop 214, and reader loop 220 are substantially parallel. In still a further embodiment, first loop 212, second loop 214, and reader loop 220 are coplanar (as designated by plane denoted by reference numeral 227).

Antenna 200 protects a responder 150 from eavesdropping from unauthorized readers (generally designated by reference number 199). First loop 212 and second loop 214 are sized to have respective first enclosed area 213 and second enclosed area 215 such that a combination of the coupling of first loop 212 and reader loop 220 is equal yet opposite to a combination of the coupling of second loop 214 and reader loop 220. In this way, reader loop 220 is decoupled from masking portion 210 including first and second loops 212, 214. Advantageously, reader loop 220 is decoupled from any signals from masking portion 210 (and more particularly, is decoupled from masking signal 103). This enables reader loop 220 to receive response signal 105 from RFID card 150 without any or minimal interference from masking signal 103.

Although unauthorized readers 199 are within broadcast range of RFID card 150, unauthorized readers 199 are coupled to masking portion 210 and therefore receive masking signal 103. Masking signal 103 masks (i.e., interferes with, degrades, and/or prevents) unauthorized readers' reception of response signal 105. In this way, masking signal 103 thwarts or prevents unauthorized readers 199 from eavesdropping on response signal 105 and/or any antenna 200/ RFID card 150 transactions.

In another embodiment, first and second loops 212, 214 are decoupled from reader loop 220 by adjusting a size of first enclosed area 213 of first loop 212 and/or a size of second enclosed area 215 of second loop 214. Adjusting such sizes may include using one or more adjuster elements (generally designated by reference numeral 230), such as thumb wheels, bevel gears, etc., operable to expand and/or contract enclosed areas 213, 215.

More particularly, in some embodiments, adjuster elements 230 include first adjuster element 230A and second adjuster element 230B each coupled to portions of one of the loops 212, 214 (which may be referred to as an adjustable loop). Adjuster elements 230A, 230B are operable to expand and/or contract enclosed area 213 about phase center point 219 of masking portion 210. For example, either or both of adjuster elements 230A, 230B can include a thumb wheel which when rotated drives a shaft having ends defining inner threaded voids for engaging with threaded portions of the adjustable loop.

In a further embodiment, antenna 200 includes trimmer 260 to control a proportion of current $I_T$ supplied to first loop 212 relative to second loop 214. In so doing, any coupling between first and second loop 212, 214 and reader loop 220 can be reduced, minimized, and/or cancelled. For example, the proportion of current $I_T$ can be represented by the following relationship (Equation 1) between current $I_1$ supplied to first loop 212 and current $I_2$ supplied to second loop 214:

$$I_2 = M_{01}/M_{02} * (I_1 - I_T). \quad (1)$$

Here, $M_{01}$ is the inductive mutual coupling at first loop 212 from reader loop 220 and $M_{02}$ is the inductive mutual coupling at second loop 214 from reader loop 220. Overall coupling between each of first and second loops 212, 214 and reader loop 220 can be represented by the following relationship (Equation 2):

$$I_{RG} = j\omega M_{01} * I_1 - j\omega M_{02} * I_2. \quad (2)$$

Here, $I_{RG}$ represents any current in reader loop 220 resulting from any radio frequency coupling to first and second loops 212, 214. Substituting Equation 1 for $I_2$ in Equation 2 and solving for $I_{RG}$ yields a value of 0. In other words, reader loop 220 is decoupled from first and second loops 212, 214.

Advantageously, trimmer 260 may be used to correct any inaccuracy in the current moment balance between first and second loops 212, 114. Such inaccuracies, for example, may be due to manufacturing tolerances (i.e. limitations of the precision of the antenna manufacturing process), misalignments incurred during antenna installation, and/or other contributing factors.

In some embodiments, trimmer 260 includes a field-effect transistor used to control current balance to each of the first and second loops 212, 214. Trimmer 260 provides current $I_T$ based on measurement of a signal received at a drive point of antenna 200. In some instances, trimmer 260 may be adjusted to control drive point impedance to reduce, minimize, and/or eliminate radio frequency coupling between masking portion 210 and reader loop 220.

In a further embodiment, strength of response signal 105 generated by RFID card 150 is orders of magnitude below that of strength of signals from reader loop 220, such as strength of interrogation signal 117. Therefore, masking portion 210 can generate masking signal 103 to provide an interference field of sufficient strength to degrade response signal 105 about antenna 200, without adversely impacting performance of reader loop 220.

In some embodiments, the strength of masking signal 103 can be at least 10 time greater (for example, 1000 times greater) than the minimum usable response from RFID card 150 at reader loop 220. This is because any coupling of masking signal 103 into reader loop 220 can be suppressed by a factor of at least 10,000 such that response signal 105 from RFID card 150 can be at least 10 times greater in strength than that of masking signal 103 incident at reader loop 220. However, masking signal 103 incident at an unauthorized receiver 199 (for example, a rogue antenna) can be at least 100 (for example, 1000 times greater) in strength than that of response signal 105 from RFID card 150.

Figure 3:
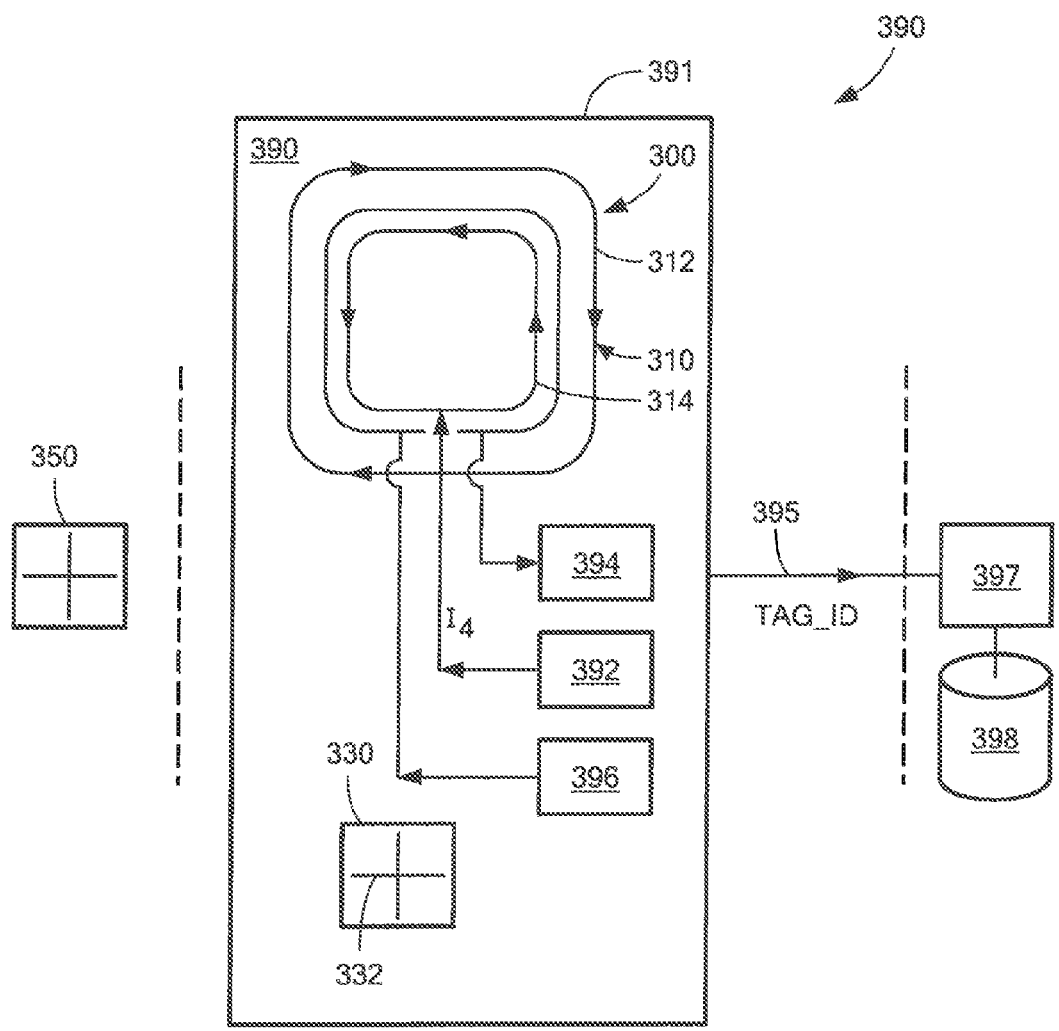
FIG. 3 is a pictorial view of an embodiment of an RFID system according to the systems, concepts, and techniques described herein.

Referring now to FIG. 3, in another aspect radio frequency identification (RFID) system 390 includes antenna 300 (as may be the same or similar to antenna 100 described in conjunction with FIG. 1) including masking portion 310 to broadcast a masking signal (as may be the same or similar to masking signal 103 described in conjunction with FIG. 1). Masking portion 310 includes first loop 312 and second loop 314 connected to first loop 312. Current $I_4$ supplied to masking portion 310 flows in opposite polarity in each of first and second loops 312, 314. Antenna 300 also includes reader loop 320 to receive a response signal (as may be the same or similar to response signal 105 described in conjunction with FIG. 1) from responder 350 and decoupled from the masking signal.

In a further embodiment, RFID system 390 is mounted on portable electronic device 391 including, but not limited to, a cell phone, laptop computer, and/or hand-held computer. Portable electronic device 391 may optionally include RFID card 330. RFID card 330 may be associated with a unique card identifier (hereinafter referred to as an RFID tag) and includes a processor to generate tag information using RFID responder loop 332.

RFID system 390 may be passively powered via inductive signal coupling from an external antenna (not shown) and/or actively powered via a power supply (not shown). RFID system 390 may include other components such as antenna circuitry such as an operational amplifier, noise filter, comparators, and/or logic processors.

In some embodiments, RFID system 390 includes masking signal generator 392 coupled to masking portion 310 to generate the masking signal, responder signal processor 394 coupled to reader loop 320 to generate identification information included in the response signal, and/or interrogation signal generator 396 coupled to reader loop 320 to generate an interrogation signal (as may be the same or similar to interrogation signal 117 described in conjunction with FIG. 1) to request information from the responder 350.

Responder signal processor 394 may generate an output signal 395 including RFID tag information received from RFID card responder 350. Such information may be received by external applications 397 which may use the tag information to authenticate and/or identify the RFID card users or to track tagged items. For example, upon valid presentation of RFID tag information, a gateway security system can provide user access to a facility. In another example, a location tracking system may use RFID tag information to track tagged items and/or users. Tag information may be verified against information stored in a database 398.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. An antenna comprising:
    a masking portion to broadcast a masking signal, comprising:
        a first loop; and
        a second loop connected to the first loop, wherein a current supplied to the masking portion flows in opposite polarity in each of the first and second loops;
    a reader loop to receive a response signal from a responder and decoupled from the masking signal,
    wherein the masking signal masks the response signal about the responder and the first loop defines a first enclosed area and the second loop defines a second enclosed area smaller than the first enclosed area, and the first loop, second loop, and reader loop are in parallel; and
    at least one adjuster element coupled to at least one of the first loop or the second loop, herein known as the adjustable loop, configured to adjust a size of the enclosed area of the adjustable loop.

2. The antenna of claim 1, wherein the at least one adjuster element adjusts the size of the enclosed area about a phase center point of the adjustable loop.

3. The antenna of claim 1, wherein the first loop, second loop, and reader loop are coplanar and are centered about a phase center point.

4. The antenna of claim 1, wherein the responder is a radio frequency identification (RFID) card or portable electronic device which transmits the response signal in response to an interrogation signal transmitted by the reader loop.

5. The antenna of claim 4, wherein the interrogation signal includes a request for information and the response signal includes the information.

6. The antenna of claim 1, wherein the masking signal is at least 10 times stronger than the response signal.

7. The antenna of claim 1, wherein the masking signal is generated based on the response signal.

8. The antenna of claim 1, wherein the masking signal appears as noise to mask the response signal.

9. The antenna of claim 1, wherein the masking signal is generated based on another response signal from at least one other antenna in the area about the responder.

10. The antenna of claim 1, further comprising:
    a trimmer to control a proportion of the current supplied to each of the first and second loops.

11. A method for protecting RF communications using an antenna having a reader loop, a first loop and a second loop, comprising:
    generating an interrogation signal;
    receiving a response signal in the reader loop of the antenna;
    providing a current to a first loop of the antenna and a second loop of the antenna coupled to the first loop, the current being of reverse polarity between the first and second loops;
    decoupling the first loop and the second loop from the reader loop of the antenna in the radio frequency domain; and
    generating a masking signal using the first loop and the second loop to mask the response signal within the area about the responder; wherein said decoupling comprises:
    at least one of: adjusting a size of a first enclosed area of the first loop about a phase center point of the first loop or controlling a size of a second enclosed area of the second loop about a phase center point of the second loop, wherein the second enclosed area is smaller than the first enclosed area, the first and second loop are coplanar and parallel to the reader loop.

12. The method of claim 11, wherein said decoupling comprises controlling a proportion of the current to each of the first loop and the second loop.

13. The method of claim 11, wherein the response signal originates from an RFID card or portable electronic device and said receiving a response signal comprises receiving identification information from the RFID card or portable electronic device.

14. The method of claim 11, wherein said generating a masking signal comprises generating the masking signal to appear as noise.

15. The method of claim 11, wherein said generating a masking signal comprises generating the masking signal based on the response signal.

16. The method of claim 11, wherein said generating a masking signal comprises generating the masking signal based on another response signal from at least one other antenna in the area about the antenna.

17. The method of claim 11, wherein said generating a masking signal comprises generating the masking signal to be at least 10 times stronger than the response signal.

18. A radio frequency identification (RFID) system comprising:
    an antenna comprising:
        a masking portion to broadcast a masking signal, comprising:
            a first loop; and
            a second loop connected to the first loop, wherein a current supplied to the masking portion flows in opposite polarity in each of the first and second loops;
        a reader loop to receive a response signal from a responder and decoupled from the masking signal,
        wherein the masking signal masks the response signal about the responder; and
        at least one adjuster element coupled to at least one of the first loop or the second loop, herein known as the adjustable loop, configured to adjust a size of the enclosed area of the adjustable loop.

19. The RFID system of claim 18, wherein the first loop defines a first enclosed area and the second loop defines a second enclosed area smaller than the first enclosed area, and the first loop, second loop, and reader loop are parallel.

20. The RFID system of claim 18, wherein the at least one adjuster element adjusts the size of the enclosed area about a phase center point of the adjustable loop.

21. The RFID system of claim 18, wherein the antenna is mounted on a portable electronic device.

22. The RFID system of claim 21, wherein the portable electronic device includes an RFID card.

23. The RFID system of claim 18, further comprising:
    a masking signal generator coupled to the masking portion to generate the masking signal.

24. The RFID system of claim 18, further comprising;
    a responder signal processor coupled to the reader loop to generate an output signal including identification information included in the response signal.

25. The RFID system of claim 18, further comprising:
    an interrogation signal generator coupled to the reader loop to generate a request for information from the responder.

26. The RFID system of claim 18, further comprising:
    a trimmer to control a proportion of the current supplied to each of the first and second loops.

* * * * *